United States Patent
Forsberg et al.

(10) Patent No.: US 9,644,475 B2
(45) Date of Patent: May 9, 2017

(54) COMMUNICATIONS PROTOCOL FOR DOWNHOLE DATA COLLECTION

(71) Applicants: Michael A Forsberg, Claremore, OK (US); Mike Allen Swatek, Claremore, OK (US); James Joseph Freeman, Houston, TX (US); Steve James Coulston, Houston, TX (US); Thomas McClain Scott, Cypress, TX (US); Nicholas L Bayard, Tomball, TX (US); Henry Chang, Sugar Land, TX (US)

(72) Inventors: Michael A Forsberg, Claremore, OK (US); Mike Allen Swatek, Claremore, OK (US); James Joseph Freeman, Houston, TX (US); Steve James Coulston, Houston, TX (US); Thomas McClain Scott, Cypress, TX (US); Nicholas L Bayard, Tomball, TX (US); Henry Chang, Sugar Land, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 85 days.

(21) Appl. No.: 14/687,348

(22) Filed: Apr. 15, 2015

(65) Prior Publication Data

US 2016/0305236 A1    Oct. 20, 2016

(51) Int. Cl.
*E21B 47/12*    (2012.01)
*E21B 47/00*    (2012.01)
*H04L 29/08*    (2006.01)

(52) U.S. Cl.
CPC .......... *E21B 47/12* (2013.01); *E21B 47/0007* (2013.01); *H04L 67/12* (2013.01)

(58) Field of Classification Search
CPC .......... E21B 47/00; E21B 47/12; E21B 47/06; E21B 47/065; H04L 67/12
USPC ...................................................... 340/855.3
See application file for complete search history.

(56) References Cited

U.S. PATENT DOCUMENTS

| | | | | |
|---|---|---|---|---|
| 5,182,730 A | * | 1/1993 | Scherbatskoy | E21B 41/0085 367/43 |
| 5,253,271 A | * | 10/1993 | Montgomery | H04L 27/365 332/103 |
| 7,207,396 B2 | * | 4/2007 | Hall | E21B 47/122 175/40 |
| 2011/0125749 A1 | * | 5/2011 | Wood | H04L 43/026 707/737 |
| 2015/0029036 A1 | * | 1/2015 | Xiao | E21B 47/12 340/855.3 |

(Continued)

OTHER PUBLICATIONS

Spracklen, et al.; "Advanced Data Communications for Downhole Data Logging and Control Applications in the Oil Industry"; IOP Conf. Series: Materials and Engineering 51 (2013), 6 pages.

*Primary Examiner* — Joseph Feild
*Assistant Examiner* — Omar Casillashernandez
(74) *Attorney, Agent, or Firm* — Cantor Colburn LLP (57) ABSTRACT

A method of managing data obtained in a borehole is provided. The method includes monitoring a characteristic with at least one sensor and obtaining raw data therefrom; indexing the raw data with the at least one sensor; recording the indexed data with the at least one sensor; forming a data packet with the at least one sensor, the data packet including at least a portion of the indexed data and index information; and transmitting the data packet in a predetermined segment of a communication protocol.

17 Claims, 4 Drawing Sheets

(56) References Cited

U.S. PATENT DOCUMENTS

2015/0137987 A1* 5/2015 Donderici ............... E21B 47/12
340/856.4
2016/0097240 A1* 4/2016 Ren .......................... E21B 7/12
175/5

* cited by examiner

COMMUNICATIONS PROTOCOL FOR DOWNHOLE DATA COLLECTION

BACKGROUND

Oil-well and other exploration applications employ various techniques for obtaining information related to downhole devices, formations, operations, etc. The information may be collected downhole by one or more sensors and then be collected and processed downhole and/or transmitted to the surface for processing.

For example, vibration sensing and monitoring may be performed on an electric submersible pump ("ESP") to monitor the status of the pump during operation. Traditionally, peak-to-peak or average vibration values are obtained and transmitted to the surface, thus supplying information regarding the amplitude of vibration during operation of a pump. Such information may be used to provide an indication of the operational health of the ESP or other downhole device.

SUMMARY

A method of managing data obtained in a borehole is provided. The method includes monitoring a characteristic with at least one sensor and obtaining raw data therefrom; indexing the raw data with the at least one sensor; recording the indexed data with the at least one sensor; forming a data packet with the at least one sensor, the data packet including at least a portion of the indexed data and index information; and transmitting the data packet in a predetermined segment of a communication protocol.

A system for managing data from a downhole device is provided. The system includes at least one sensor configured to monitor a characteristic of a downhole device or formation. The sensor is configured to collect raw data related to the downhole device or formation; store said collected data; and index said collected data. The system further includes a processing unit configured to request information from the at least one sensor. The at least one sensor is further configured to generate a packet including at least part of the collected data and information about the index of the at least part of the collected data and transmit the generated packet in a segment of a communication protocol.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF EXEMPLARY EMBODIMENTS

Systems and methods for communicating data from a downhole tool to the surface are provided. Such system and methods are used, in some embodiments, to provide raw data collected during monitoring of a monitored element, e.g., device, formation, etc. In some embodiments, such systems and methods are used to obtain raw data related to a monitored characteristic and transmit such raw data for processing. In some embodiments, a communication system includes at least one sensor configured to monitor a characteristic of a downhole device or formation. The sensor is configured to collect raw data related to the downhole device or formation; store said collected data; and index said collected data. The system further includes a processing unit configured to request information from the at least one sensor. The at least one sensor is further configured to generate a packet including at least part of the collected data and information about the index of the at least part of the collected data and transmit the generated packet in a segment of a communication protocol.

In other embodiments, a method of managing data obtained in a borehole is provided. The method includes monitoring a characteristic with at least one sensor and obtaining raw data therefrom; indexing the raw data with the at least one sensor; recording the indexed data with the at least one sensor; forming a data packet with the at least one sensor, the data packet including at least a portion of the indexed data and index information; and transmitting the data packet in a predetermined segment of a communication protocol.

Figure 1:
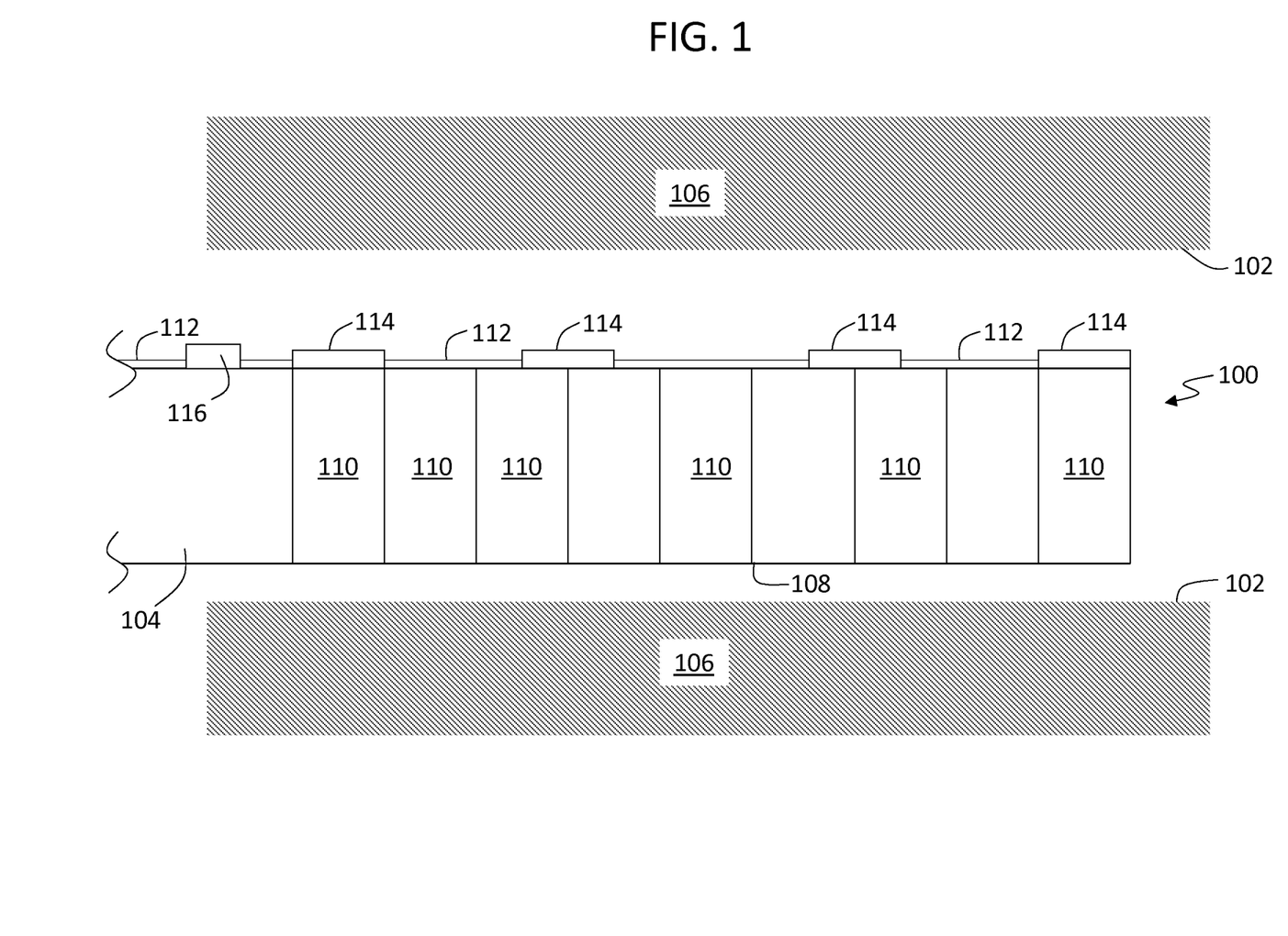
FIG. 1 is a schematic of an exemplary tool in accordance with an embodiment of the invention.

Referring to FIG. 1, an exemplary embodiment of a downhole system 100 associated with a borehole 102 is shown. A borehole string 104 is run in the borehole 102, which penetrates at least one earth formation 106 for facilitating operations such as drilling, extracting matter from the formation, sequestering fluids such as carbon dioxide, and/or making measurements of properties of the formation 106 and/or the borehole 102 downhole. The borehole string 104 includes any of various components to facilitate subterranean operations. The borehole string 104 is made from, for example, a pipe, multiple pipe sections, or flexible tubing. The borehole string 104 includes for example, a drilling system and/or a bottom-hole assembly (BHA) or downhole tool 108 attached to the borehole string 104.

The system 100 and/or the borehole string 104 include any number of downhole tools 108 for various processes including drilling, hydrocarbon production, and formation evaluation for measuring one or more physical properties, characteristics, quantities, etc. in and/or around a borehole 102. For example, the tool 108 may include a drilling assembly and/or a pumping assembly. Various measurement tools may be incorporated into the system 100 to affect measurement regimes such as wireline measurement applications and/or logging-while-drilling (LWD) applications.

In one embodiment, the tool 108 represents an electrical submersible pump (ESP) assembly connected to the borehole string 104, which may be formed from production string or tubing, as part of, for example, a bottom-hole assembly (BHA). The ESP assembly is utilized to pump production fluid through the borehole string 104 to the surface. The ESP assembly includes various components 110, such as motor(s), seal(s), pump(s), inlet or intake portion(s), etc. The motor(s) drives the pump(s), and the pump(s) is configured to take in fluid (typically an oil/water mixture) via an inlet(s) and discharge the fluid at an increased pressure into the borehole string 104. The motor, in some embodiments, is supplied with electrical power via an electrical conductor such as a downhole power cable 112, which is operably connected to a power supply system or other power source such as surface power sources and/or downhole power sources.

The downhole tool 108 and other downhole components (not shown) are not limited to those described herein. In various embodiments, the tool 108 may include any type of tool or component that experiences strain, deformation, vibration, stress, or other impact downhole. Examples of tools that experience strain, vibration, and other impacts include motors or generators such as ESP motors, other pump motors and drilling motors, as well as devices and systems that include or otherwise utilize such motors. Further, the downhole components may be any downhole tool or element that is of sufficient length that vibration or other impact may influence the life and/or usefulness of the tool or element, such as packers, etc. Further, in various embodiments, the downhole tool may be configured to monitor and/or obtain information related to the formation 106. Thus, although described herein as an ESP, the tool 108 may be any downhole tool or device, and the ESP is presented for illustrative and explanatory purposes; the invention is not limited thereby. Further, the data collected and transmitted as described herein may be any information collected by sensors and/or devices associated with downhole devices and/or equipment and/or borehole and formation characteristics.

The system 100 also includes one or more sensors 114 configured to perform various functions in the system 100, such as communication and sensing various parameters related to the downhole tool 108. For example, sensors 114 may be configured as vibration sensors distributed over the surface of the tool 108. The sensors 114, configured as vibration sensors, may be accelerometers configured in different orientations at several axial locations, as shown in FIG. 1. The sensors 114 may each be connected by the power cable 112, and thus may receive power therefrom and may also employ the power cable 112 as a means of transmitting or communicating sensed data.

Thus, the power cable 112 may be configured to transmit data and commands between two or more sensors 114 and/or between the sensors 114 and components 110 of the tool 108 and/or between one or more downhole components and one or more surface components, such as a surface processing unit (not shown). In alternative embodiments, the communication aspect over or on the power cable 112 may be replaced and/or supplemented with discrete or dedicated communications lines, such as copper wires, by wireless communication mechanisms and/or other types of wired communication.

Although shown with the sensors 114 external to the components 110 of the tool 108, the sensors may be configured to be clamped to the tool 108, or in some embodiments the sensors may be configured integral with the tool 108 or with components 110 of the tool 108. Each of the sensors 114 is configured to transmit data that is obtained by the respective sensor 114. In some embodiments, as shown in FIG. 1, the sensors 114 may be configured in communication with a downhole processing unit 116 that collects the information obtained by the sensors 114. Processing unit 116 may further be configured to process and/or communicate the data to the surface. In such embodiments, the processing unit 116 may be configured with a central processing unit/core and/or memory configured to store information or data collected from the sensors 114 and/or executable programs, algorithms, etc. In some embodiments, the sensors 114 may be configured with a processor such that the data, as disclosed herein, is generated and transmitted by the sensors 114, without the need for a separate processing unit 116 or in addition thereto. Further, although shown with a plurality of sensors 114, those of skill in the art will appreciate that the number of sensors 114 may be varied or changed to any number without departing from the scope of the invention.

Traditionally, each of the sensors 114 (or the processing unit 116) will monitor real-time vibrations and determine a gross peak-to-peak vibration sample of the tool 108 during operation. From this sample, a maximum vibration measurement may be extracted and sent to the surface. Thus, a limited overall vibration level reading may be determined, and may be useful for trending with respect to the structural and/or operational health of the downhole tool 108. Under current schemes, this may be the extent of the information that is transmitted to the surface due to bandwidth constraints in the communications protocols that are employed for data transfer in downhole applications. However, obtaining raw data or information (rather than a representative peak value) may be advantageous.

Figure 2:
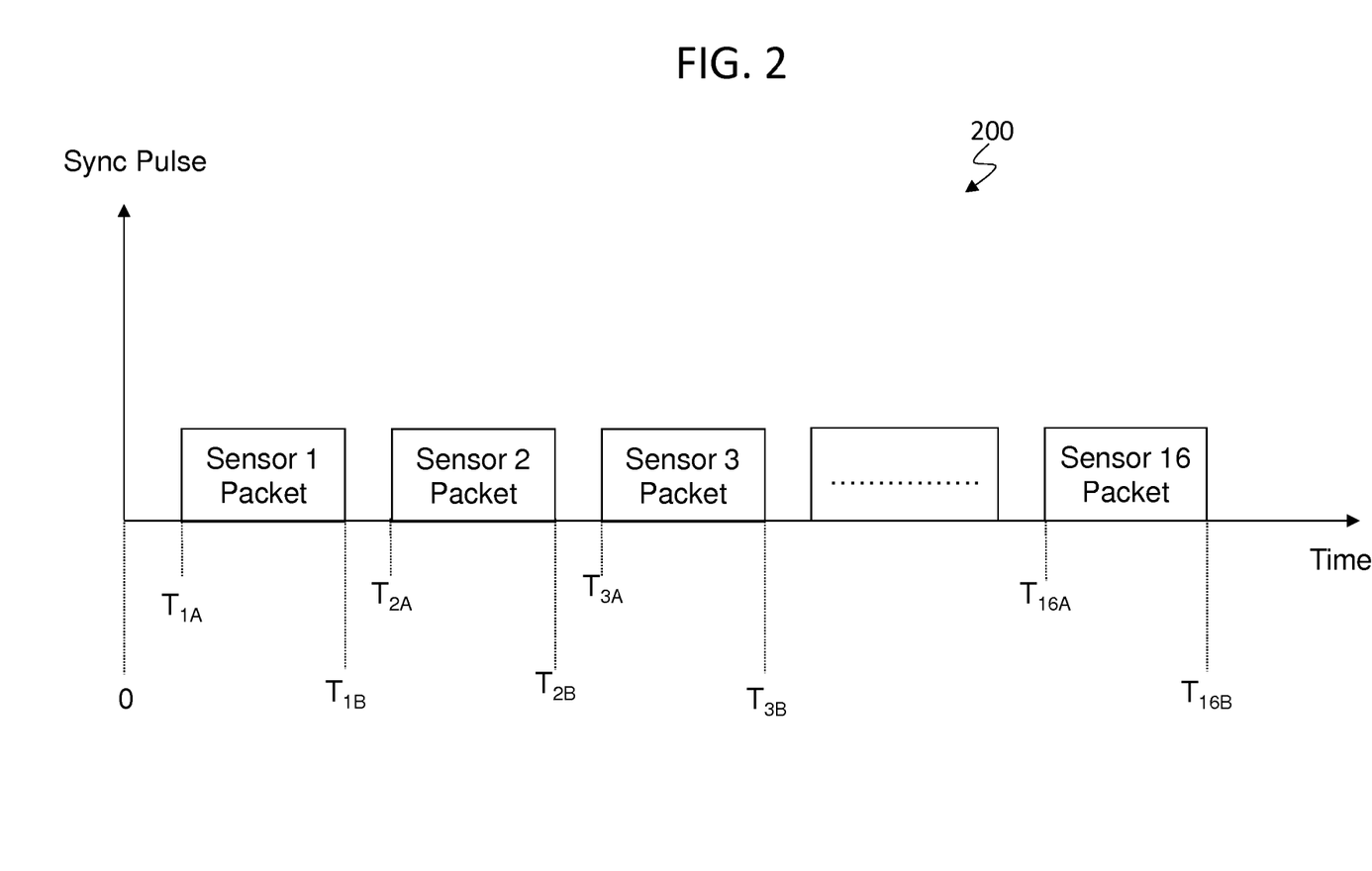
FIG. 2 is a schematic showing a communications scheme of data packet transmissions in accordance with an embodiment of the invention.

Turning now to FIG. 2, a measurement diagram 200 in accordance with an exemplary embodiment is shown. The diagram 200 represents a plurality of packet transmissions that are sent from a plurality of sensors, such as sensors 114 of FIG. 1. The diagram shows the timing of events, e.g., packet transfers, in a time division multiplex communication protocol employed by various embodiments of the invention. As shown, the time plot of the diagram 200 increase from left to right. Although described herein as a time division multiplex communication protocol, this is merely provided for exemplary purposes. Those of skill in the art will appreciate that other protocols, such as code division multiplexing, frequency division multiplexing, etc. may be used without departing from the scope of the invention. Thus, although described below with respect to time-spaced packets, those of skill in the art will appreciate that the packet structure and transmission may be adjusted or configured appropriately for the specific communication protocol used by the system, such that the data or packet is transmitted within an appropriate segment (frequency segment, code segment, etc.) of the communication protocol.

In this example, there may be sixteen sensors (Sensor 1, Sensor 2, Sensor 3 . . . Sensor 16). In order to obtain information from each sensor and to not exceed bandwidth constraints of the system, each tool may transmit a packet containing information collected by a sensor during a specific time interval. For example, the communications protocol may be configured as a time division multiplex protocol, where each sensor is assigned a specific address and time slot within the bandwidth for communication. Time-division multiplexing (TDM) is a method of transmitting and receiving independent signals over a common signal path by means of synchronized switches at each end of the transmission line so that each signal appears on the line only a fraction of time in an alternating pattern. An exemplary pattern of the invention is shown in FIG. 2.

The communication process may be controlled by a processing unit that is in communication with the sensors, e.g., the processing unit 116 of FIG. 1. The processing unit may be configured as an interface card or similar device that is configured to communicate with each of the sensors. Thus the processing unit may be configured as a master device for communication within the system, at least with respect to the sensors. In an exemplary embodiment, for example, the sensors may continuously obtain data associated with the component or formation that is being monitored and store the collected raw data within the sensor. The master may send a synchronization signal ("sync pulse") which initiates the transmission of the data from the sensors to the master. The sync pulse, for example, may define or have a rate that may be varied from 80 ms to 3.2 s.

When a sensor receives or detects the sync pulse, the sensor may be configured to perform a specific function. For example, the sensor may recognize that the sync pulse has been detected and immediately transmit data in response to the sync pulse. However, because of limited bandwidth, each sensor cannot transmit data at the exact same time. Thus, a sensor may wait a predefined or predetermined period of time before transmitting one or more packets of data. The time delay may be determined by the sensor address. Specifically, each sensor may be addressable over the communications network, and based on the address, the time delay may be preset such that more than one sensor does not transmit data at a time. Each sensor will have a different address such that only one sensor may be transmitting data in a time slot.

As shown in FIG. 2, the sync pulse may be sent at time 0, such as at 0 ms, indicating the start of a data collection period. Sensor 1 may be the first tool to transmit a packet of data at $T_{1A}$, e.g., 4 ms after the start of the pulse, which may be a pre-determined time after a sync pulse is received. The packet of Sensor 1 has a length in the time domain that ends at time $T_{1B}$. In this example, $T_{1B}$ may be at 26.5 ms. Each subsequent packet transmission has a time period of $T_{\#A}$ to $T_{\#B}$, where "#" is the sensor number. Further, each packet transmitted by each sensor has a length of the same size. That is, each packet is configured similarly. In the above described example, each packet may be 22.5 ms. Although specific number are provided here for example, those of skill in the art will appreciate that any numbers/timing may be used based on the communications speed or on other parameters of the system.

Those of skill in the art will appreciate that the length of the packet may be configured for optimal transmission of the data contained within the packet while maximizing usage of available bandwidth in the system. Thus, in operation, the packet of Sensor 1 will be transmitted, a predetermined wait period will occur, and then the packet from Sensor 2 will be transmitted. Thus, in sequence, each packet from the sensors will be transmitted, with a wait period between each transmission. In the exemplary embodiment shown in FIG. 2, the wait period is 5.5 ms, however, those of skill in the art will appreciate that the wait period may be any length of time or may be eliminated, without departing from the scope of the invention.

Figure 3:
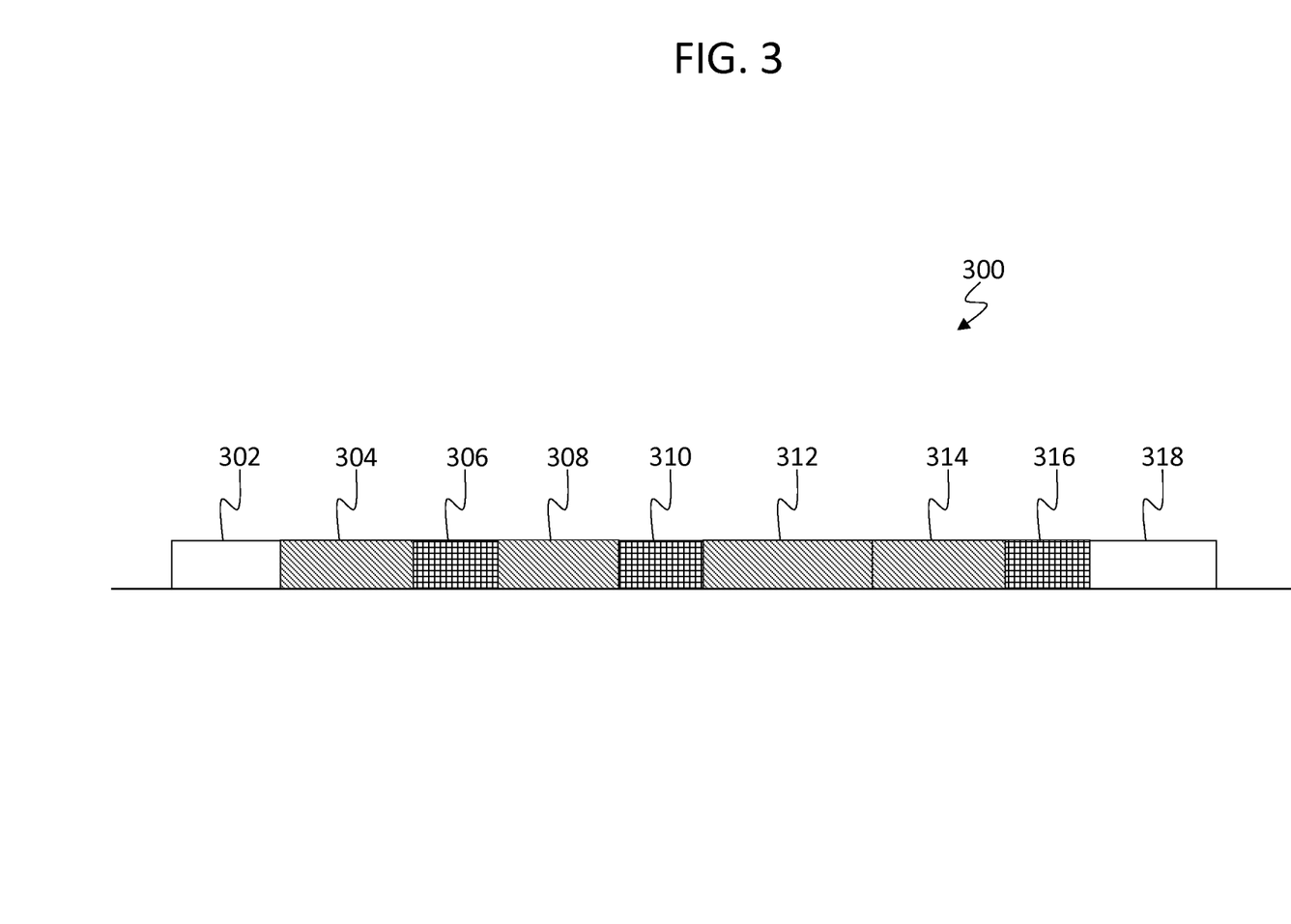
FIG. 3 is a schematic of a data packet in accordance with an exemplary embodiment of the invention.

Referring now to FIG. 3, an exemplary packet structure in accordance with embodiments of the invention is shown. Packet 300 includes a number of elements. As shown in FIG. 3, the packet 300 includes a preamble 302 which is configured to provide information to a receiving device regarding the source of the information. For example, the preamble may include information or data identifying the sensor from which the data of the packet originates. Further, the preamble may include additional information, such as time, synchronization, error detection, address, etc. as known in the art.

The preamble 302 is followed by a first data element 304. The data contained in the first data element 304 may be any data collected or generated by the sensor that is sending the packet. For example, in an exemplary embodiment, the first data element 304 may include spectrum values and/or selected spectrum values, such as peak-to-peak vibration data, of a device that the sensor is monitoring. The first data element 304 is then followed by a first parity element 306. First parity element 306 may be configured as a bit or bits within the packet that is provided for error detection purposes. For example, the first parity element 306 may be employed to ensure that the data of the packet 300 is not corrupted during the transfer process.

After the first parity element 306, a second data element 308 may be provided. The data contained in the second data element 308 may be any data collected or generated by the sensor that is sending the packet. For example, in an exemplary embodiment, the second data element 308 may be configured as temperature data related to the monitored device. After the second data element 308, a second parity element 310 is provided.

The second parity element 310 is followed by a spectral index element 312 and spectral data 314. The data contained in the spectral index element 312 and the spectral data 314 may be any data collected or generated by the sensor that is sending the packet. For example, in an exemplary embodiment, the spectral index element 312 may be configured as an indexing element related to the spectral data 314. As shown in FIG. 3, the spectral index element 312 is followed by spectral data 314. The spectral data 314 is raw data collected by the sensor. The spectral data 314 is followed by a third parity element 316, which is followed by a stop 318 that is configured to indicate the end of the data packet.

As shown in FIG. 3, the packet 300 includes raw data in the form of spectral data 314. The spectral data 314 may be a data point, collection of data, sequence of data, subset of a data, etc. that has been collected by the sensor. Over time data points or a quantity of spectral data 314 will be received at a processor. The spectral data must be synchronized and/or reconstructed such that the data contained therein may be useful for processing. Thus, the spectral index element 312 is provided such that a number of spectral data 314 elements may be reconstructed into a complete set of data representative of the actual data collected by the sensor, rather than just an average and/or representative value. For example, a vibration spectrum of a device monitored by one or more sensors may be reconstructed from the raw spectral data. Advantageously, the spectrum created from the raw spectral data may be used to provide a more comprehensive understanding of the state of the monitored device.

Although shown in FIG. 3 as a particular construction of the data packet, those of skill in the art will appreciate that the construction of the data packet is not limited to this exemplary embodiment. For example, the first data element of the packet may be the raw data and/or the raw data index, or some other data. Thus, the order of elements within the packet is not limited to the embodiment shown in FIG. 3. Further, those of skill in the art will appreciate that the parity elements may be omitted or a different configuration of the parity elements may be provided.

Figure 4:
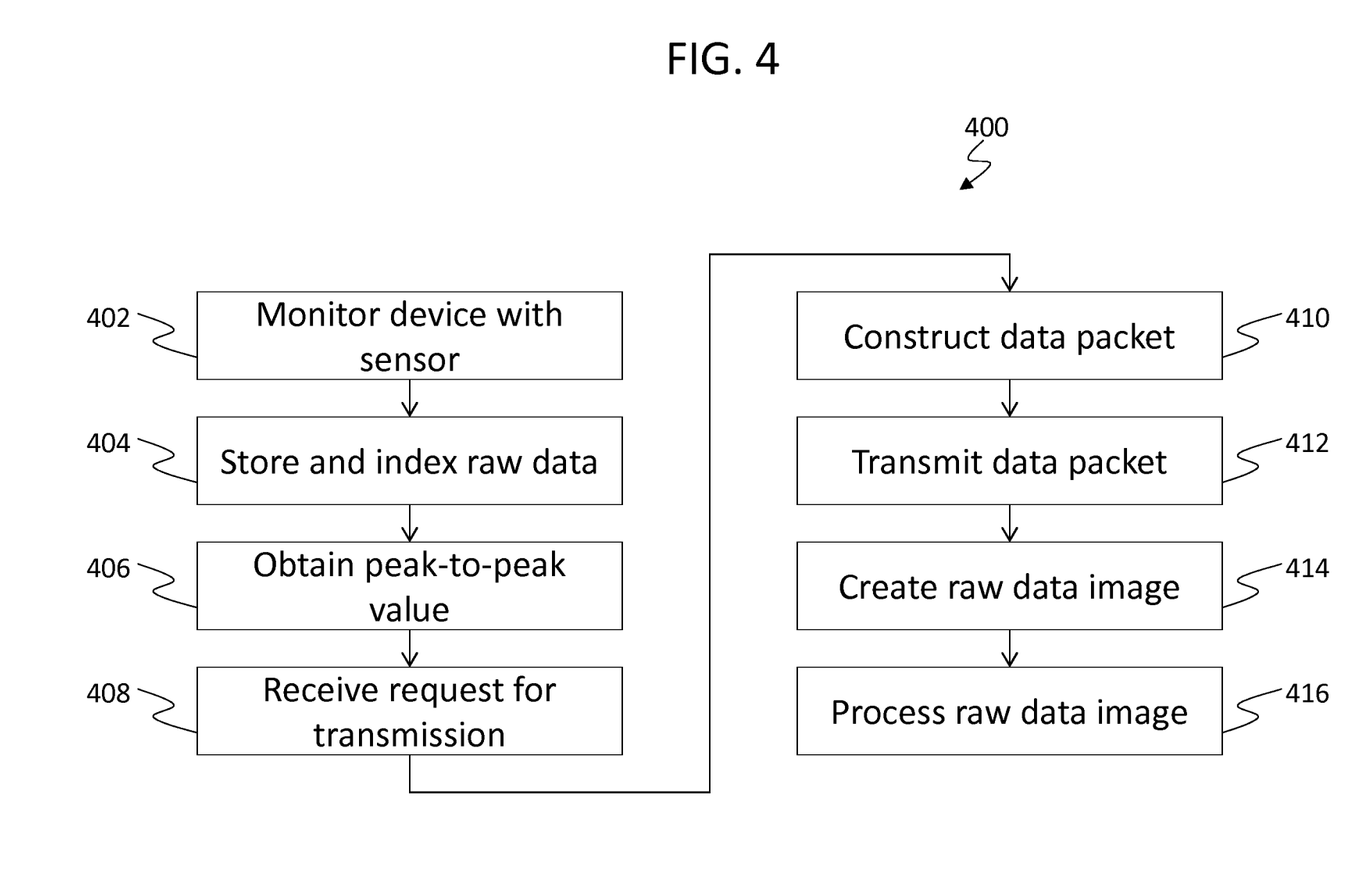
FIG. 4 is a process of data collection and transmission in accordance with an exemplary embodiment of the invention.

Referring now to FIG. 4, a process of data collection and transmission in accordance with an exemplary embodiment is shown. Process 400 begins with a sensor monitoring a device in a downhole configuration at step 402. Step 402 may occur continuously, upon demand, or at predetermined times, intervals, etc. During step 402 raw data may be sampled or collected for a fixed or predetermined time period or interval, or continuously.

At step 404 the raw data is stored in a memory in the sensor. During step 404 the raw data may be indexed, such that each element of raw data may be identified relative to all the other elements of raw data collected. At step 406 a frequency spectrum may be obtained from the raw data collected at step 402 (whether stored or continuously obtained) and spectrum values and/or selected spectrum values, such as a peak-to-peak value, may be saved into the memory of the sensor. Those of skill in the art will appreciate that steps 402-406 may occur simultaneously or nearly simultaneously, or may occur in various sequences. Thus, FIG. 4 is not a limiting configuration and structure of the process with respect to obtaining the information related to the device monitored by the sensors.

A step 408 a request for data may be received at the sensor. The request may originate from a downhole component or from a surface component. When the request is received, the sensor may construct a data packet at step 410, including both (i) the spectrum values and/or selected spectrum values data and (ii) the raw data or a portion thereof, e.g., as shown in FIG. 3. Those of skill in the art will appreciate that the data packet constructed at step 410 may be constructed at any time, and is not required to be formed only upon request for transmission of the data. At step 412, the data packet may be transmitted to the requesting component, or to another component, as instructed in the request.

At step 414, a processor uses the index of the raw data to recreate a raw data image based on the raw data. In some embodiments, multiple requests for data and/or multiple transmissions of data packets may be required before reconstruction or recreation of a raw data image may be possible. Once the raw data image is created at step 414, post-processing may be performed at step 416 to determine various characteristics, events, or trends related to the sensed data and the device or formation that is monitored. For example, the raw data image may be used and/or processed to reveal markers that indicate the health of a pump and/or motor of an ESP.

The systems and methods described herein provide various advantages. The systems and methods provide a mechanism to transmit raw data that can be used to reconstruct actual vibration spectra of a monitored device, in addition to obtaining the traditional peak-to-peak vibration data.

Further, advantageously, embodiments of the invention may be employed with various types of sensors, such as vibration sensors, accelerometers, temperature sensors, stress and strain sensors, etc., and be used to understand near-real-time operation of a monitored device.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Further, such analytical components may be configured on the surface, downhole, or a combination of these.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments and/or features.

For example, although described herein as an ESP, the downhole tool may be any downhole tool that may undergo vibration or other operational changes, indicators, characteristics, etc. during operation within a formation. Thus, for example, the monitoring system may be configured to monitor, collect, and transmit raw data related to any desired operational or health characteristic.

Accordingly, the invention is not to be seen as limited by the foregoing description, but is only limited by the scope of the appended claims.

What is claimed is:

1. A method of managing data obtained in a borehole, the method comprising:
   disposing an electrical submersible pump having a plurality sensors into the borehole;
   monitoring a vibration characteristic of the electrical submersible pump with the plurality of sensors and obtaining raw vibration data therefrom;
   indexing the raw vibration data using each respective sensor to generate indexed data in accordance with an index to enable reconstruction of the raw vibration data from the plurality of sensors after transmission;
   recording the indexed data using each respective sensor;
   forming a data packet using each respective sensor, the data packet including (i) source information identifying the respective sensor, (ii) at least a portion of the indexed data, and (iii) index information, wherein the index and index information identify each element of the collected raw vibration data relative to all other elements of the collected raw vibration data; and
   transmitting the data packet in a predetermined segment of a communication protocol.

2. The method of claim 1, further comprising:
   generating a frequency spectrum based on the obtained raw data, wherein
   the data packet includes at least one of spectrum values and selected spectrum values.

3. The method of claim 1, wherein each sensor is a vibration sensor.

4. The method of claim 1, further comprising reconstructing the indexed data into a raw data image with a processing unit based on the index.

5. The method of claim 4, further comprising processing the raw data image with the processing unit.

6. The method of claim 4, further comprising determining at least one of an operational and a structural aspect of the electrical submersible pump based on the raw data image.

7. The method of claim 1, wherein the data packet further includes at least one parity element.

8. The method of claim 7, wherein the communication protocol is time division multiplexing and the segment is a predetermined time slot.

9. The method of claim 7, further comprising receiving a request to transmit the indexed data at each sensor, and the transmitting is in response to said request.

10. A system for managing data from a downhole device, comprising:
  an electrical submersible pump;
  a plurality of sensors configured to monitor a vibration characteristic of the electrical submersible pump, each sensor configured to:
  collect raw vibration data related to vibration of the electrical submersible pump;
  store said collected data; and
  index said collected data with an index to enable reconstruction raw vibration data from the plurality of sensors after transmission; and
  a processing unit configured to request information from the plurality of sensors,
  wherein the each sensor is further configured to:
    generate a packet including (i) source information identifying the respective sensor, (ii) an element of the collected raw vibration data, and (iii) information about the index of the at least part of the collected data, where the index and index information identify each element of the collect raw vibration data relative to all other elements of the collected raw vibration data; and
  transmit the generated packet in a segment of a communication protocol.

11. The system of claim 10, wherein the packet further includes at least one of a preamble, a parity element, and at least one additional element of information related to the electrical submersible pump.

12. The system of claim 10, wherein the processing unit is located on a surface of the formation.

13. The system of claim 10, wherein each sensor is further configured to determine a frequency spectrum based on the raw data and the packet further includes at least one of spectrum values and selected spectrum values.

14. The system of claim 10, further comprising an analyzing unit configured to receive the collected data from the packet and configured to generate a raw data image based on the collected data and the index information.

15. The system of claim 14, wherein the analyzing unit is configured to determine at least one of an operational and a structural aspect of the electrical submersible pump based on the raw data image.

16. The system of claim 10, wherein the communication protocol is time division multiplexing and the segment is a predetermined time slot.

17. The system of claim 10, wherein each sensor is configured to receive a request to transmit the indexed data and transmit said indexed data in response to said request.

* * * * *